(12) United States Patent  
Iwata (10) Patent No.: US 9,128,738 B2  
(45) Date of Patent: Sep. 8, 2015

(54) INFORMATION PROCESSING PROGRAM AND INFORMATION PROCESSING METHOD

(71) Applicant: Sanken Electric Co., Ltd., Niiza-shi (JP)

(72) Inventor: Tetsuki Iwata, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 13/666,372

(22) Filed: Nov. 1, 2012

(65) Prior Publication Data

US 2013/0117841 A1    May 9, 2013

(30) Foreign Application Priority Data

Nov. 4, 2011    (JP) .................................. 2011-242184

(51) Int. Cl.
| | |
|---|---|
| G06F 12/14 | (2006.01) |
| G06F 9/455 | (2006.01) |
| G06F 9/44 | (2006.01) |
| G06F 11/00 | (2006.01) |
| G06F 7/04 | (2006.01) |
| G06F 21/57 | (2013.01) |

(52) U.S. Cl.
CPC .............. *G06F 9/45512* (2013.01); *G06F 9/44* (2013.01); *G06F 21/577* (2013.01)

(58) Field of Classification Search
CPC ...... G06F 9/44; G06F 9/45512; G06F 21/577
See application file for complete search history.

(56) References Cited

U.S. PATENT DOCUMENTS

| | | | | |
|---|---|---|---|---|
| 6,397,116 | B1* | 5/2002 | Matsumoto | 700/96 |
| 7,890,995 | B2* | 2/2011 | Shim et al. | 726/11 |
| 8,327,459 | B2* | 12/2012 | Aoki et al. | 726/28 |
| 8,566,934 | B2* | 10/2013 | Srivastava et al. | 726/22 |
| 2001/0052030 | A1* | 12/2001 | Shiraishi | 709/310 |
| 2006/0015748 | A1* | 1/2006 | Goto et al. | 713/190 |
| 2009/0013374 | A1* | 1/2009 | Tsai | 726/1 |
| 2012/0005722 | A1* | 1/2012 | Olsen et al. | 726/1 |
| 2012/0311672 | A1* | 12/2012 | Connor et al. | 726/4 |

OTHER PUBLICATIONS

Full text of "Compatibility of a Microsoft® Windows 7 Compatible Application for Application Developers", (online), Microsoft Corporation, Jul. 27, 2010, 117 pages (with English Translation of the part related to the invention).
Chapter 3 of "Compatibility of a Microsoft® Windows 7 Compatible Application for Application Developers", (online), Microsoft Corporation, Jul. 27, 2010, 10 pages (with English Translation of the part related to the invention).
Chapter 1 of "Compatibility of a Microsoft® Windows 7 Compatible Application for Application Developers", (online), Microsoft Corporation, Jul. 27, 2010, 6 pages (with English Translation of the part related to the invention).

* cited by examiner

*Primary Examiner* — Dede Zecher
*Assistant Examiner* — Trang Doan
(74) *Attorney, Agent, or Firm* — Oblon, McClelland, Maier & Neustadt, L.L.P.

(57) ABSTRACT

An information processing device stores, in a storage device, command execution user data associating an attribute of a command with a name of a user entitled to execute the command. When execution of the command is requested, a service of the information processing device extracts, from the command execution user data, a name of a user entitled to execute the requested command and executes the command with the extracted user name.

2 Claims, 6 Drawing Sheets

| TYPE OF EVENT | EVENT NOTIFICATION COMMAND (VALID/INVALID) | | | | USER SETTING COMMAND | | |
|---|---|---|---|---|---|---|---|
| | LOG DISPLAY | POPUP NOTIFICATION | MAIL NOTIFICATION | VALID/ INVALID | COMMAND PASS | EXECUTION ATTRIBUTE | |
| BATTERY OPERATION | VALID | VALID | VALID | VALID | c:¥bin¥backup.exe | BACKGROUND | |
| UPS TEST COMPLETION | VALID | VALID | INVALID | VALID | c:¥bin¥copy.exe | DIALOG TYPE | |
| ... | ... | ... | ... | ... | ... | ... | |
| BATTERY EXCHANGE NECESSITY OCCURRENCE | VALID | INVALID | VALID | INVALID | | | |
| BATTERY EXCHANGE NECESSITY RESET | VALID | INVALID | INVALID | VALID | c:¥bin¥copy.exe | User_A/password | |
| ... | ... | ... | ... | ... | ... | ... | |

| MANAGEMENT SOFTWARE | | LOGIN USER: MANAGEMENT USER | LOGOUT |

MAIN MENU
INFORMATION DISPLAY OF UPS
SETTING OF MANAGEMENT SOFTWARE
[EVENT CUSTOMIZATION]
STATE NOTIFICATION
EVENT SETTING
WARNING EVENT SETTING
SETTING TO UPS
HELP

MENU > WARNING EVENT SETTING
■ WARNING EVENT SETTING ■

| NUMBER | WARNING EVENT | COMMAND |
| --- | --- | --- |
| | | LOGIN DISPLAY (VALID/INVALID) / POPUP FUNCTION (VALID/INVALID) / MAIL FUNCTION (VALID/INVALID) |
| 1 | BATTERY OPERATION | □VALID / ○DIALOG TYPE (SCREEN DISPLAY IS PERFORMED FOR WINDOWS) ○BACKGROUND ○ARBITRARY USER (USER NAME [ ]) / TEST EXECUTION □LOG □POPUP □MAIL PASSWORD [ ] |
| 2 | UPS TEST COMPLETION | □VALID / ○DIALOG TYPE (SCREEN DISPLAY IS PERFORMED FOR WINDOWS) ○BACKGROUND ○ARBITRARY USER (USER NAME [ ]) / TEST EXECUTION □LOG □POPUP □MAIL PASSWORD [ ] |
| 3 | ALARM OCCURRENCE | □VALID / ○DIALOG TYPE (SCREEN DISPLAY IS PERFORMED FOR WINDOWS) ○BACKGROUND ○ARBITRARY USER (USER NAME [ ]) / TEST EXECUTION □LOG □POPUP □MAIL PASSWORD [ ] |
| 4 | ALARM RESET | □VALID / ○DIALOG TYPE (SCREEN DISPLAY IS PERFORMED FOR WINDOWS) ○BACKGROUND ○ARBITRARY USER (USER NAME [ ]) / TEST EXECUTION □LOG □POPUP □MAIL PASSWORD [ ] |
| 5 | LOGIN DETECTION | □VALID / ○DIALOG TYPE (SCREEN DISPLAY IS PERFORMED FOR WINDOWS) ○BACKGROUND ○ARBITRARY USER (USER NAME [ ]) / TEST EXECUTION □LOG □POPUP □MAIL PASSWORD [ ] |

CLICK SETTING BUTTON AND COMPLETE SETTING (401, 402)

| ATTRIBUTE OF COMMAND | | EXECUTION USER |
|---|---|---|
| SCREEN DISPLAY | | LOGIN USER |
| BACKGROUND | | SYSTEM |
| FILE UPDATE | SYSTEM FOLDER | SYSTEM |
| | LONGIN USER FOLDER | LOGIN USER |
| | NON-LOGIN USER FOLDER | NON-LOGIN USER |

INFORMATION PROCESSING PROGRAM AND INFORMATION PROCESSING METHOD

CROSS REFERENCE TO RELATED APPLICATION

This application claims benefit of priority under 35 U.S.C. §119 to Japanese Patent Application No. 2011-242184 filed on Nov. 4, 2011, the entire contents of which are incorporated by reference herein.

BACKGROUND OF THE INVENTION

1. Field of the Invention

The present invention relates to an information processing program and an information processing method that is executed in a computer in which a user entitled to execute a command is limited by the attribute of the command.

2. Description of the Related Art

Nowadays, various devices are used in the utilization of computers. One of the devices is a UPS (Uninterruptible Power Supply). The UPS is a power supply device that enables continuous power supply for a given period of time in order to prevent the interruption of power supply to a computer due to a power failure.

In order to appropriately utilize such devices, it is mandatory to use an application program for managing these devices. The management program can set a method of notifying a timing at which the operation of the UPS is started and set an instruction to perform backup when the UPS operates, for example.

On the other hand, in order to enhance security, the operation system of a computer may apply user account control (UAC). The user account control allows only a specific user to execute a specific command. For example, it is made possible only for the user to access a storage region for the specific user. Moreover, a computer is limited such that only a system user can execute a command related to control on the entire computer. As described above, with the user account control, it is possible to enhance security and provide a stable operation system.

Along with the trend of recent security enhancement, commands executable by an arbitrary login user may be limited. Specifically, when a specific command is executed, an operation system displays a screen for inquiring "Is this command allowed to be executed?" In this case, only when the user gives an explicit instruction such as by pressing an OK button, the command is executed.

This may make it difficult to smoothly execute an application. Specifically, in order to input the explicit instruction to the inquiring screen, the user needs to stand by in front of the computer. Hence, it is difficult to operate the computer without human intervention. In particular, since the UPS described above is urgently required to supply power to a computer in many cases, a problem caused by security enhancement may become significant.

In order to avoid this problem, Non-patent Document 1 ("Compatibility of a Microsoft(R) Windows 7 compatible application for application developers" [online], Microsoft Corporation, Jul. 27, 2010, [searched on Oct. 31, 2011], Internet <http://download.microsoft.com/download/B/0/6/B06C5017-9589-4B43-BC18-24052C3C3F15/Windows7_Compatibility.docx>) proposes that a setting for making a computer perform execution as an administrator is made, and an application is executed by the authority of the administrator. Non-patent Document 1 also proposes a method of designing an application which does not need the promotion described above.

Moreover, Non-patent Document 2 ("Compatibility of a Microsoft(R) Windows 7 compatible application for application developers" [online], Microsoft Corporation, Jul. 27, 2010, [searched on Oct. 31, 2011], Internet <http://msdn.microsoft.com/ja-jp/windows/dd882526>) proposes a method of executing an application by utilizing the fact that an old operation system has low level of security. Non-patent Document 2 discloses a compatible mode in which an application is operated in an old operation system. In the compatible mode, the application is operated on an old operation system having low level of security, and thus the problem caused by security enhancement is avoided.

However, the methods disclosed in the non-patent documents are considered not to be sufficient measures.

For example, in the method disclosed in non-patent document 1, although it is not necessary to change an application, it is necessary to individually set the attribute of the application. Moreover, although, in a current operation system, a function of allowing the operation in an old operation system by utilizing the compatible mode is provided, the provision of this function is not permanently guaranteed. Hence, in order to prevent a problem caused by the limitation of a user account, it is necessary to develop an application, which may impose a burden on an application developer. The stand point of security enhancement may lose the intention of the provision of an access limitation in an operation system.

SUMMARY OF THE INVENTION

An object of the present invention is to provide an information processing program and an information processing method that can smoothly execute a command in a computer in which a user entitled to execute a command is limited by the attribute of the command.

To overcome the above-mentioned problem, according to a first aspect of the present invention, there is provided a non-transitory medium usable by a computer that incorporates a computer-readable information processing program in which a user entitled to execute a command is limited by an attribute of the command, wherein the information processing program includes: a first program code that causes the computer to function as a service providing unit which is resident in a memory of the computer and provides a service; and a second program code that causes the computer to function as the service providing unit which, when execution of a command is requested, extracts a name of a user entitled to execute the requested command from command execution user data associating the attribute of the command with the name of the user entitled to execute the command, and executes the command with the extracted user name.

According to a second aspect of the present invention, the first program code causes the computer to function as the service providing unit which receives the request of execution of the command from a command requesting unit functioning in the computer or a communication network.

According to a third aspect of the present invention, the second program code causes the computer to function as the service providing unit which generates a new process and executes the command with the extracted user name in the process.

According to a fourth aspect of the present invention, there is provided an information processing method of executing a command in a computer in which a user entitled to execute the command is limited by an attribute of the command, the method including: storing, in a storage device, command execution user data associating the attribute of the command with a name of a user entitled to execute the command; providing a service being resident in a memory of the computer; receiving a request of execution of a command executable only by a predetermined user with the service; and extracting, when the execution of the command is requested, the name of the user entitled to execute the requested command from the command execution user data and executing the command with the extracted user name.

According to a fifth aspect of the present invention, the receiving receives the request of execution of the command from the computer or a communication network.

According to a sixth aspect of the present invention, the executing generates a new process and executes the command with the extracted user name in the process.

According to the present invention, it is possible to provide an information processing program and an information processing method that can smoothly execute a command in a computer in which a user entitled to execute a command is limited by the attribute of the command.

DESCRIPTION OF THE EMBODIMENTS

Next, an embodiment of the present invention will be described with reference to accompanying drawings. In the following description of drawings, the same or similar parts are identified with the same or similar symbols.

An information processing method according to the embodiment of the present invention is used in an information processing device 1. The information processing device 1 is a computer in which a user entitled to execute a command is limited by the attribute of the command.

In order to enhance the security of a computer, an operation system sets a user access limitation. Hence, when an unauthorized user logs in to start an application, a command may not be properly started such as by displaying a screen for confirmation of execution of the command due to the user access limitation. In particular, the screen for confirmation of execution of the command is displayed, and the command is not executed unless an OK button is pressed. In a computer where a user access limitation is provided, it may be difficult to execute a command that is urgently required to be executed.

Hence, in the information processing method according to the embodiment of the present invention, when a command to which the user access limitation is applied at the time of execution of an application program is generated, the application program requests a service to execute this command. For the command requested to be executed, the service identifies a user entitled to execute this command. The service uses an API (Application Program Interface) or the like of the operation system, and switches to the entitled user to execute the command.

Here, the application program is a program that is executed when the user logs in. The application program is started by the operation of the user or the logging-in of the user. In general, the application program uses an input/output device of the information processing device 1 to process data based on an instruction from the user and displays its result on a screen. For example, the application program for managing a UPS displays a screen for setting a parameter for managing and controlling the UPS, and stores a parameter set by the user in a predetermined storage region.

On the other hand, the service is resident in a memory of the information processing device 1, and performs execution in the background without displaying a screen. In general, the service detects a predetermined event and processes data based on the detection. For example, the service for managing the UPS monitors the UPS, and processes data as necessary. In the embodiment of the present invention, the term "service" is used but the service is also called a "daemon" depending on the operation system.

Figure 1A:
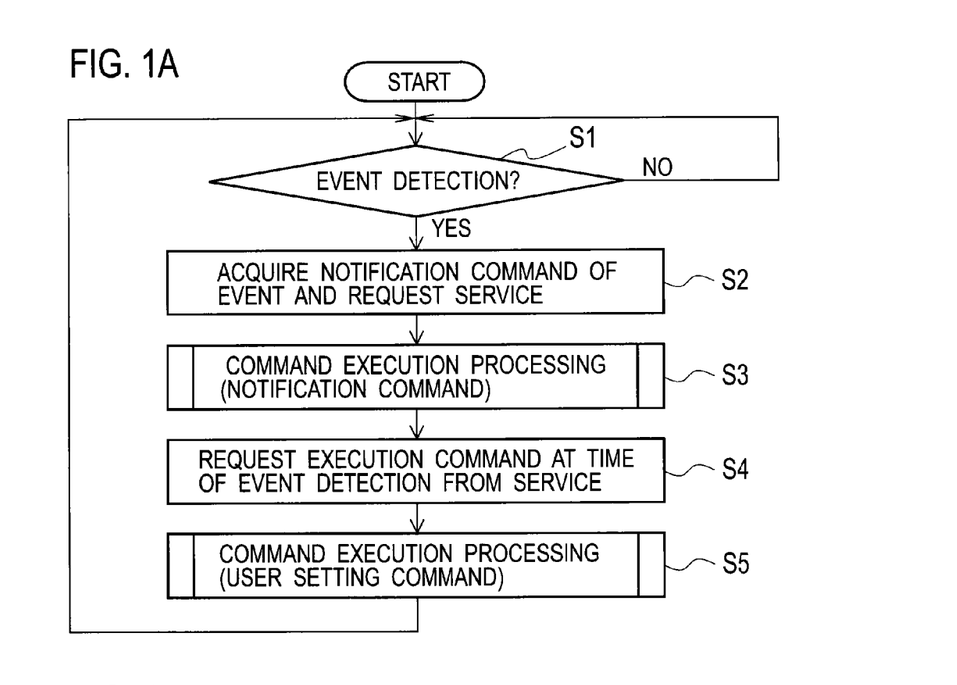
FIG. 1A is a flowchart illustrating an information processing method according to an embodiment of the present invention.
Figure 1B:
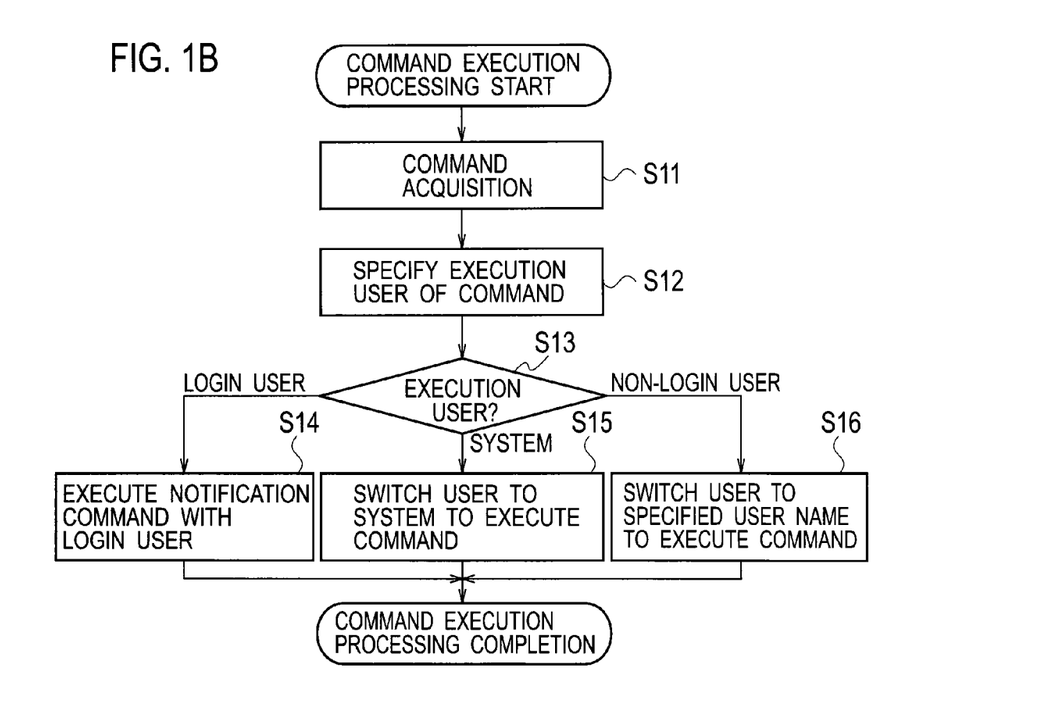
FIG. 1B is a flowchart illustrating command execution processing according to the embodiment of the present invention.

The information processing method according to the embodiment of the present invention will be described with reference to FIGS. 1A and 1B. First, as shown in FIG. 1A, in step S1, the information processing device 1 stands by for detection of an event. In the embodiment of the present invention, any event may be used. In the embodiment of the present invention, examples of the "event" include a warning for notifying an important event related to the UPS and an alarm for notifying a minor event.

In step S2, the information processing device 1, when detecting an event, acquires a command for notifying the user of this event. Furthermore, the information processing device 1 requests the service to notify the event with the acquired command. Examples of the command include a log display, a popup display and a mail notification. Thereafter, in step S3, the information processing device 1 executes, with the service being executed within the information processing device 1, the command acquired in step S2.

Furthermore, in step S4, the information processing device 1 requests, if there is a command to be executed at the time of detection of the event, the execution of the command to be executed at the time of detection of the event. The command to be executed at the time of detection of the event is a command that can be arbitrarily set by the user. The command executed here is, for example, the backup of data. Thereafter, in step S5, the information processing device 1 executes, with the service within the information processing device 1, the command at the time of detection of the event that is acquired in step S4.

The command execution processing in steps S3 and S5 of FIG. 1A will be described with reference to FIG. 1B. The processing in FIG. 1B is executed by the service, which is resident in the information processing device 1.

In step S11, the information processing device 1 acquires a command to be executed. Furthermore, in step S12, the information processing device 1 identifies a name of an execution user entitled to execute this command, and, in step S13, processing is divided depending on the execution user.

When the execution user is a login user, in step S14, the service of the information processing device 1 executes the command acquired in step S11 with this login user. When the execution user is SYSTEM, in step S15, the service of the information processing device 1 switches to the SYSTEM to execute, as the SYSTEM, the command acquired in step S11. When the execution user is not the user who is logging in, in step S16, the information processing device 1 switches to a specified user name to execute, as the specified user, the command acquired in step S11.

Figure 2:
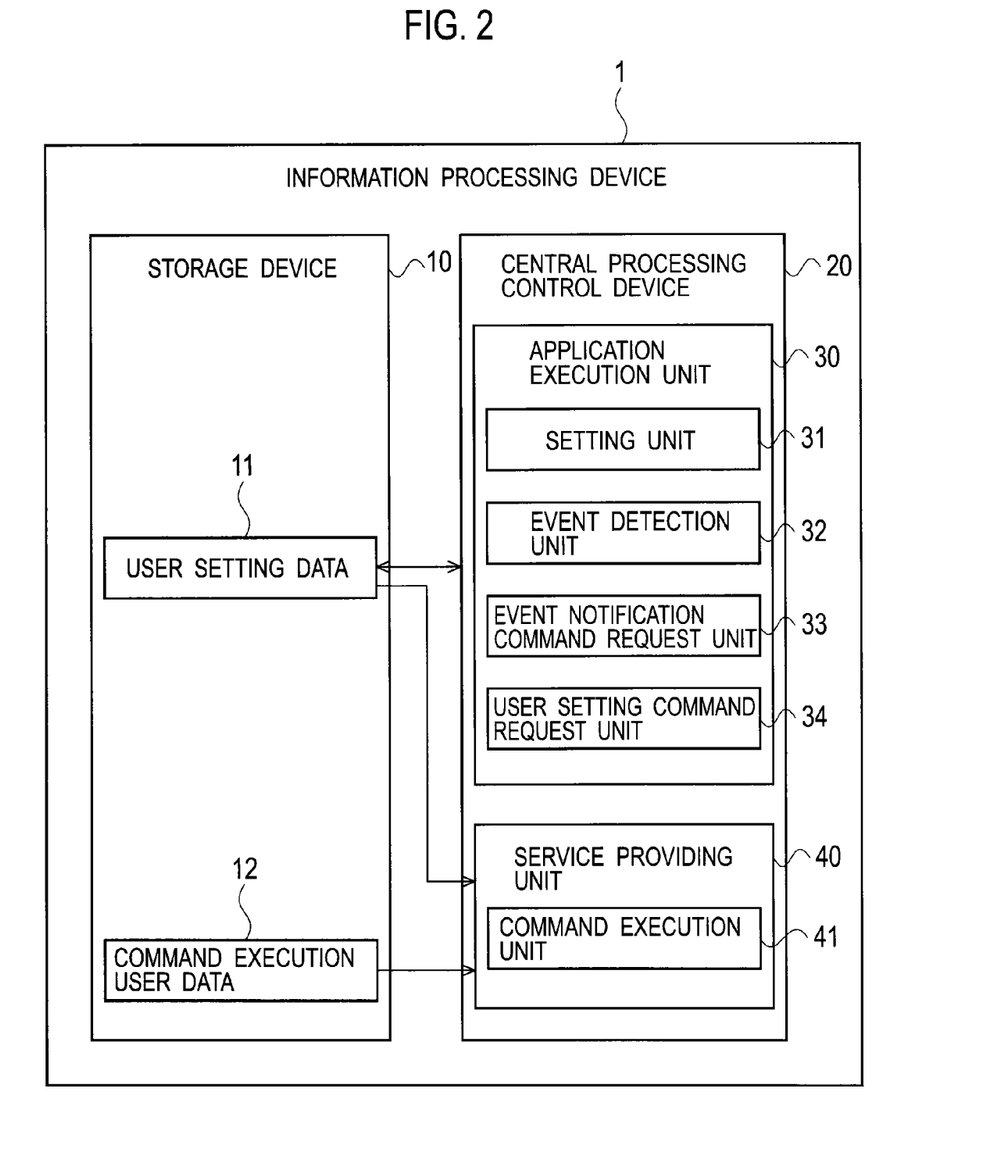
FIG. 2 is a diagram illustrating a hardware configuration of and functional blocks of an information processing device according to the embodiment of the present invention.

The information processing device 1 according to the embodiment of the present invention will be described with reference to FIG. 2. The information processing device 1 is a general computer that includes a storage device 10, a central processing control device 20, a memory (not shown), an input device (not shown), a display device (not shown), a communication control device (not shown), and the like. The storage device 10 is a storage medium such as a hard disk. The central processing control device 20 controls, through the operation system and the like, inputs to and outputs from the individual devices of the information processing device 1 to process data.

The communication control device transmits and receives information to and from other communication devices, and inputs and outputs it to and from the central processing control device 20. In the embodiment of the present invention, the information processing device 1 transmits and receives, through the communication control device, data to and from, for example, the UPS, which is the target to be managed. The communication control device may receive, through another network, an execution request of a command input from another information terminal, and input it into the central processing control device 20. Here, another information terminal described above is a computer that is not the information processing device 1, a UPS having a communication function or the like.

The storage device 10 stores the information processing program according to the embodiment of the present invention, and also stores user setting data 11 and command execution user data 12. The central processing control device 20 has the information processing program of the present invention installed therein, executes it and thereby implements an application execution unit 30 and a service providing unit 40.

The application execution unit 30 executes an application program that executes predetermined processing. The application execution unit 30 includes a setting unit 31, an event detection unit 32, an event notification command request unit 33 and a user setting command request unit 34.

The setting unit 31 generates, by the operation of the user, the user setting data 11 and stores it in the storage device 10.

The user setting data 11 is data on a command that is executed by the information processing device 1. The user setting data 11 is data associating a timing at which a command is executed with the command to be executed. The command stored in the user setting data 11 includes a command that can be executed by any user and a command that can be executed only by a predetermined user.

Figure 3:
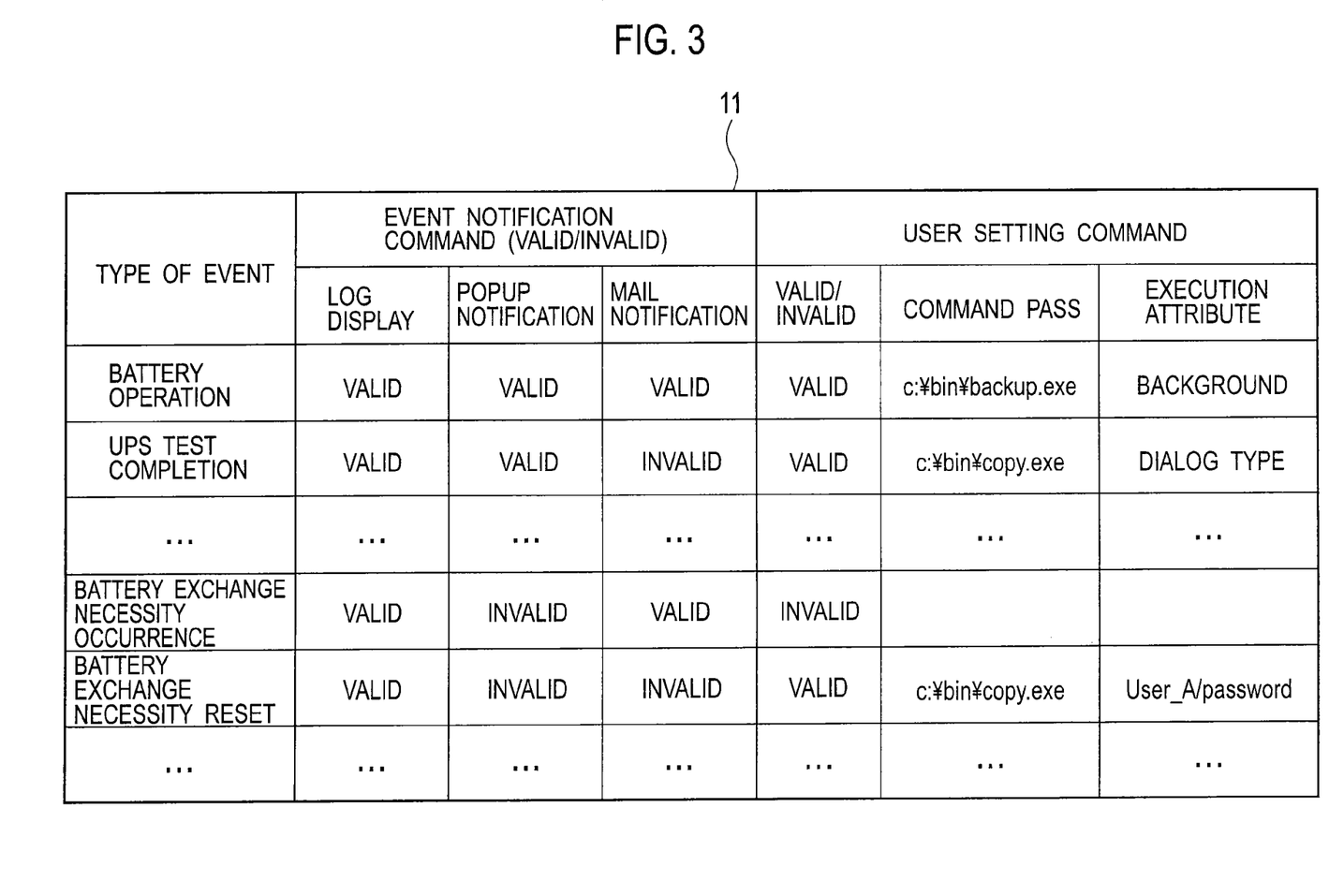
FIG. 3 is a diagram illustrating a data structure of user setting data of the information processing device according to the embodiment of the present invention and an example of the data.

The user setting data 11 includes, as shown in FIG. 3, data on an event notification command and data on a user setting command. The data on the event notification command is data on a command for notifying the occurrence of the event. The data on the user setting command is data on a command that is arbitrarily set by the user and that is executed when the event occurs. For each type of event, the user setting data 11 associates the event notification command with the user setting command.

The type of event here is a type of event that is a condition under which the application execution unit 30 requests the service providing unit 40 to provide a command. In the user setting data 11 shown in FIG. 3, when an event such as a warning or an alarm on the UPS occurs, the application execution unit 30 requests the service providing unit 40 to provide a command, wherein this command will be described. The present invention is not limited to this. For example, when a command is periodically executed, as a type of event, time information for executing the command may be set.

The data on the event notification command of the user setting data 11 shown in FIG. 3 is data for identifying, when the event occurs, a method of notifying the user of the event. The application execution unit 30 identifies a command for notifying, when the event occurs, the user of the event in a method set by the event notification command of the user setting data 11, and requests the service providing unit 40 to execute the command. In FIG. 3, with commands set "valid", the event is notified to the user.

In the example shown in FIG. 3, when an event "battery operation" occurs, a notification is provided to the user in three methods, that is, the "log display", the "popup notification" and the "mail notification." Here, the "log display" is a method in which storage in the log data of the information processing device 1 is performed and a notification is provided to the user. The "popup notification" is a method in which a popup screen is displayed on the display device of the information processing device 1, and a notification is provided to the user. The "mail notification" is a method in which mail is transmitted to a previously registered mail address, and a notification is provided to the user.

The data on the user setting command of the user setting data 11 shown in FIG. 3 is data on a command that, when the event occurs, is arbitrarily set by the user and that is executed by the information processing device 1. The data on the user setting command includes the execution attribute of a valid or invalid flag, a command pass and a command. When the event occurs, if a flag corresponding to the event is set valid, the application execution unit 30 requests the service providing unit 40 to execute a command specified by a command pass with an attribute specified by the execution attribute. The command pass is information for identifying a storage place of the command stored in the storage device 10 of the information processing device 1.

The execution attribute is information on the attribute when this command is executed. This execution attribute corresponds to the command attribute of the command execution user data 12, which will be described with reference to FIG. 6. When a "background" is specified as the execution attribute, a command for screen display is not included, and a command is executed in the background. When a "dialog type" is specified, for example, a screen for checking whether or not a command is executed is displayed, and the command to be operated is executed by an instruction input from the user. This "dialog type" corresponds to the "screen display" of the command execution user data 12. When the password of an arbitrary user is specified, a command is executed by the authorization of this arbitrary user in a state of the arbitrary user logging in with the user name and the password specified by the execution attribute.

Figure 4:
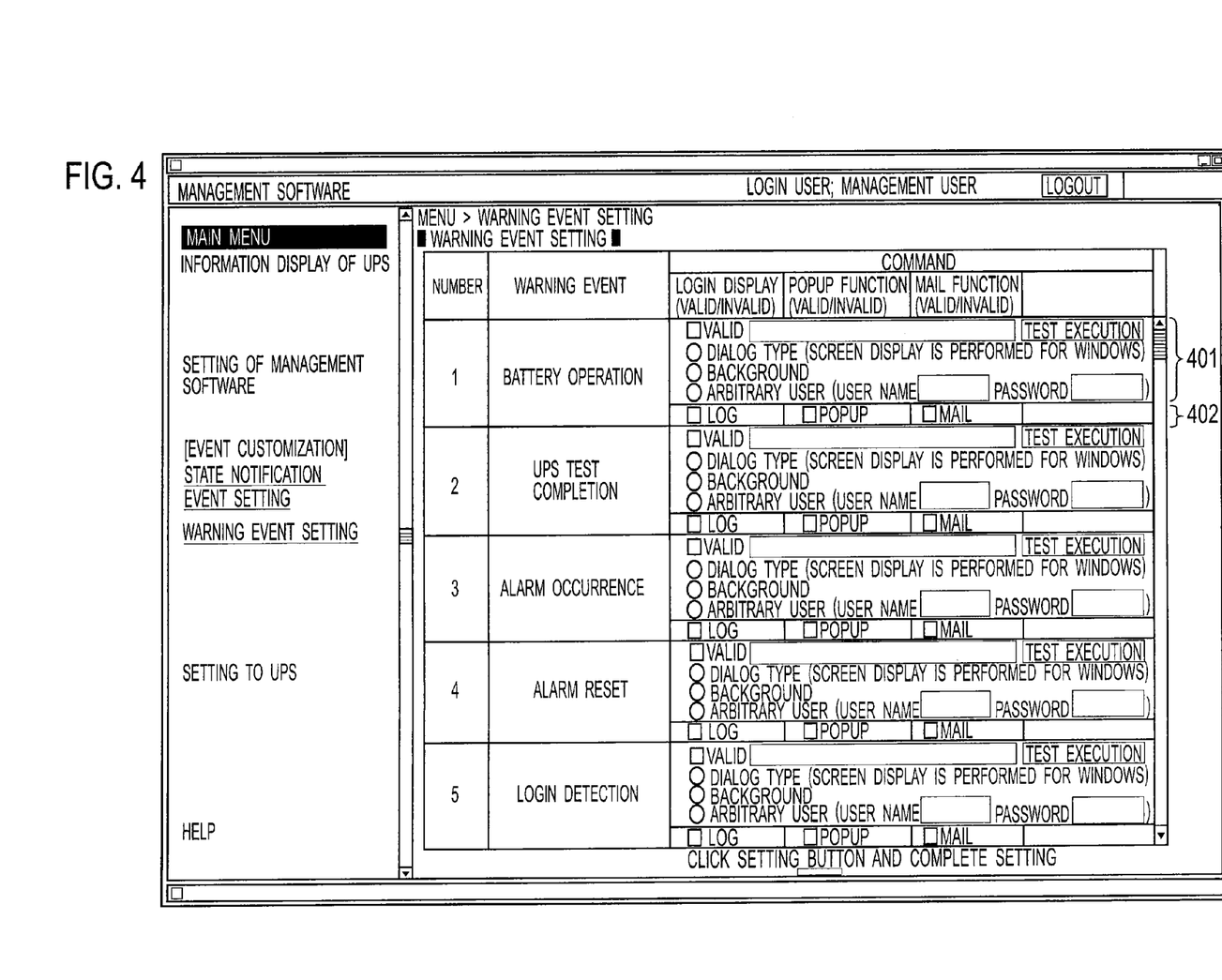
FIG. 4 is an example of a screen for setting a command when a warning of a UPS is notified, in the information processing device according to the embodiment of the present invention.
Figure 5:
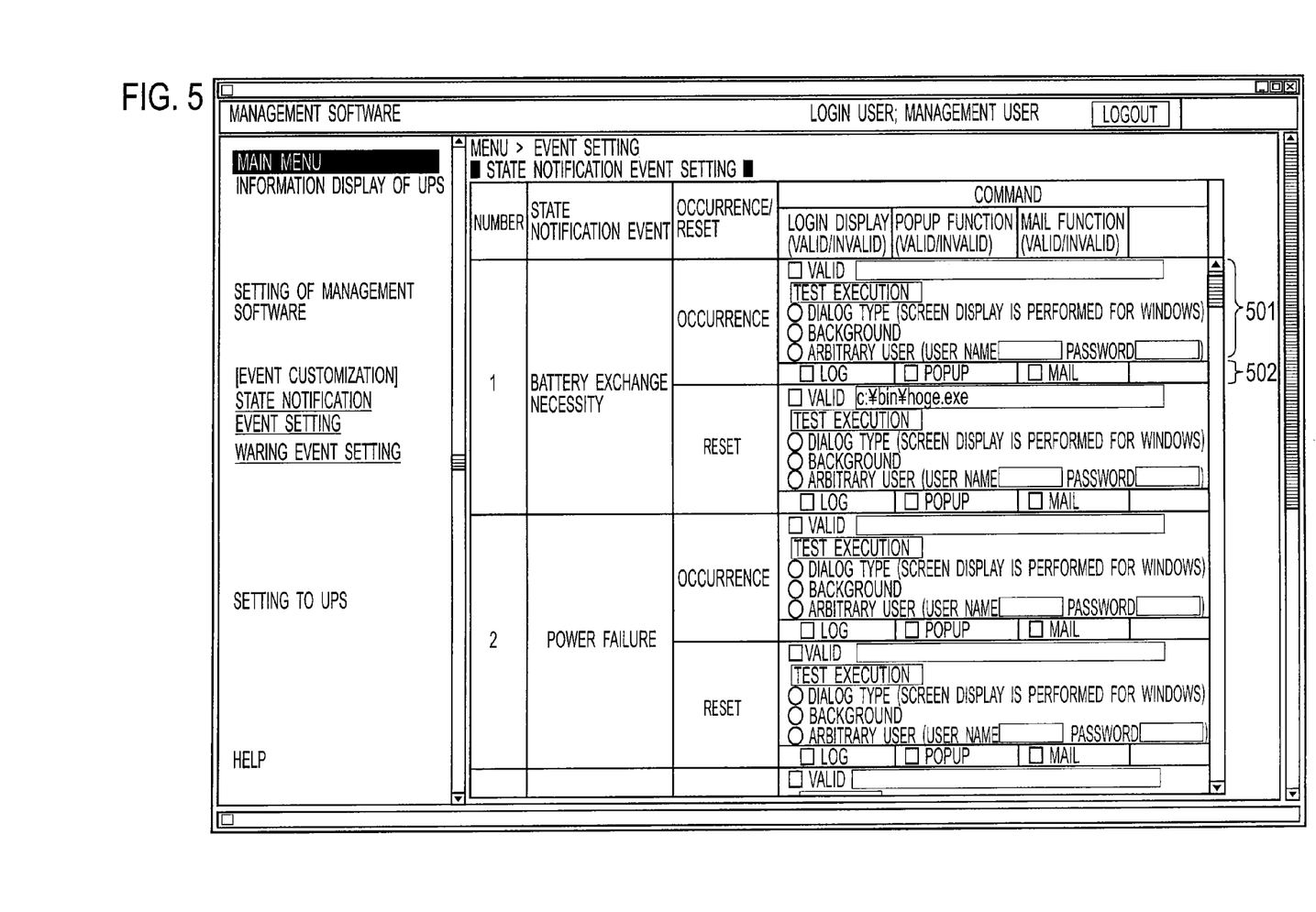
FIG. 5 is an example of a screen for setting a command when the state of the UPS is notified, in the information processing device according to the embodiment of the present invention.

The setting unit 31 generates the user setting data 11 by the input of the user to screens shown in FIGS. 4 and 5. FIG. 4 is a screen for the input of information on a command to be executed for each event with respect to the warning event related to the UPS. The screen shown in FIG. 4 includes a user command setting portion 401 and a warning notification method setting portion 402 for each event on the warning even.

The user command setting portion 401 is a data input portion for generating a user setting command of the user setting data 11. Each data item of the user command setting portion 401 corresponds to the individual data item of the user setting command of the user setting data 11. Note that, a "test execution" button is a button with which the command specified by the command pass is executed as a test. The warning notification method setting portion 402 is a data input portion for generating the event notification command of the user setting data. Each data item of the warning notification method setting portion 402 corresponds to the individual data item of the event notification command of the user setting data 11.

The screen shown in FIG. 5 is a screen for the input of information on a command to be executed for each event with respect to a state notification event related to the UPS. The screen shown in FIG. 5 includes a user command setting portion 501 and a state notification method setting portion 502 for each event. The user command setting portion 501 and the state notification method setting portion 502 are the same as the user command setting portion 401 and the warning notification method setting portion 402 described with reference to FIG. 4.

In the screens shown in FIGS. 4 and 5, when the user specifies a command to be executed for each event, the setting unit 31 associates the identifier of the event with data on a command to be executed at the time of the event, to generate the user setting data 11 and stores it in the storage device 10. When the setting unit 31 generates the user setting data 11, the user setting data 11 is referenced, as necessary, by the application execution unit 30 and the service providing unit 40.

Although, here, the processing for generating the user setting data 11 has been described, the user setting data 11 may be updated with the screens shown in FIGS. 4 and 5. The event detection unit 32 detects an event specified by the "type of event" of the user setting data 11. The processing by the event detection unit 32 corresponds to step S1 of FIG. 1A.

When the application execution unit 30 is a management application of the UPS, the event detection unit 32 detects an event such as a battery operation, a warning on the UPS for completion of a UPS test, necessity for battery exchange, or an alarm for the occurrence of a power failure or the like. When the event detection unit 32 detects the event, the fact thereof is notified to the event notification command request unit 33 together with the type of event detected.

The event notification command request unit 33 requests the service providing unit 40 to execute a command for notifying the event. The processing by the event notification command request unit 33 corresponds to the processing of step S2 in FIG. 1A.

The event notification command request unit 33, when notified of the detection of the event from the event detection unit 32, reads the user setting data 11 from the storage device 10, and causes the service providing unit 40 to notify the user of the occurrence of the event with a method specified by the event notification command. The event notification command request unit 33, when informed, for example, from the event detection unit 32 that the event "battery operation" has been detected, reads the user setting data 11 and acquires that the event notification method is the log display, the popup notification and the mail notification. The event notification command request unit 33 causes the service providing unit 40 to execute each command acquired here. The contents of the notification of the event and a template may be previously held by the application execution unit 30.

The event notification command request unit 33 previously holds the IP address and the port number of the service that executes the command. The event notification command request unit 33, when requesting the execution of the command, calls the service with the previously held IP address and the port number, and causes the called service to execute the command.

After the completion of the execution of the command by the service providing unit 40, the event notification command request unit 33 notifies the user setting command request unit 34 of the fact that the event has been detected and the type of event detected. Note that, when, in the user setting data 11, a flag is set invalid for the user setting command corresponding to this event, the processing as it is may be completed without notification to the user setting command request unit 34.

The user setting command request unit 34 requests the service providing unit 40 to execute the command when the event occurs. The processing by the user setting command request unit 34 corresponds to the processing in step S4 of FIG. 1A.

The user setting command request unit 34, when notified from the event notification command request unit 33 of the detection of the event, reads the user setting data 11 from the storage device 10, and inputs, into the service providing unit 40, a request for executing the command specified by the user setting command with the execution attribute. The user setting command request unit 34, when informed from, for example, the event notification command request unit 33 that the event "battery operation" has been detected, reads the user setting data 11 and acquires, as a command to be executed for the notification of this event, a command pass "c:¥bin¥backup.exe" and the execution attribute "background." The user setting command request unit 34 causes the service providing unit 40 to execute the command acquired here with the acquired execution attribute.

The user setting command request unit 34 previously holds the IP address and the port number of the service that executes the command. When the user setting command request unit 34 requests the execution of the command, the user setting command request unit 34 calls the service with the previously held IP address and port number, and causes the called service to execute the command.

Although, in the embodiment of the present invention, the application execution unit 30 and the service providing unit 40 are implemented within the same computer, the present invention is not limited to this configuration. The application execution unit 30 and the service providing unit 40 may be implemented in different computers. The service providing unit 40 may receive, from the same computer, the execution request of the command and may receive, through a communication network, the execution request of the command from another information terminal.

When the execution of the command by the service providing unit 40 is completed, the user setting command request unit 34 completes the processing.

The service providing unit 40 is resident in the memory of the information processing device 1 and provides the service. In the embodiment of the present invention, in particular, the service providing unit 40 includes a command execution unit 41 that executes the command requested from the application execution unit 30.

The command execution unit 41 receives a request for the execution of the command from the event notification command request unit 33 or the user setting command request unit 34. The command execution unit 41, when requested to execute the command, extracts a name of a user entitled to execute the requested command from the command execution user data 12. The command execution unit 41 extracts a name of a user entitled to execute the requested command, and executes the command with the extracted user name.

Figure 6:
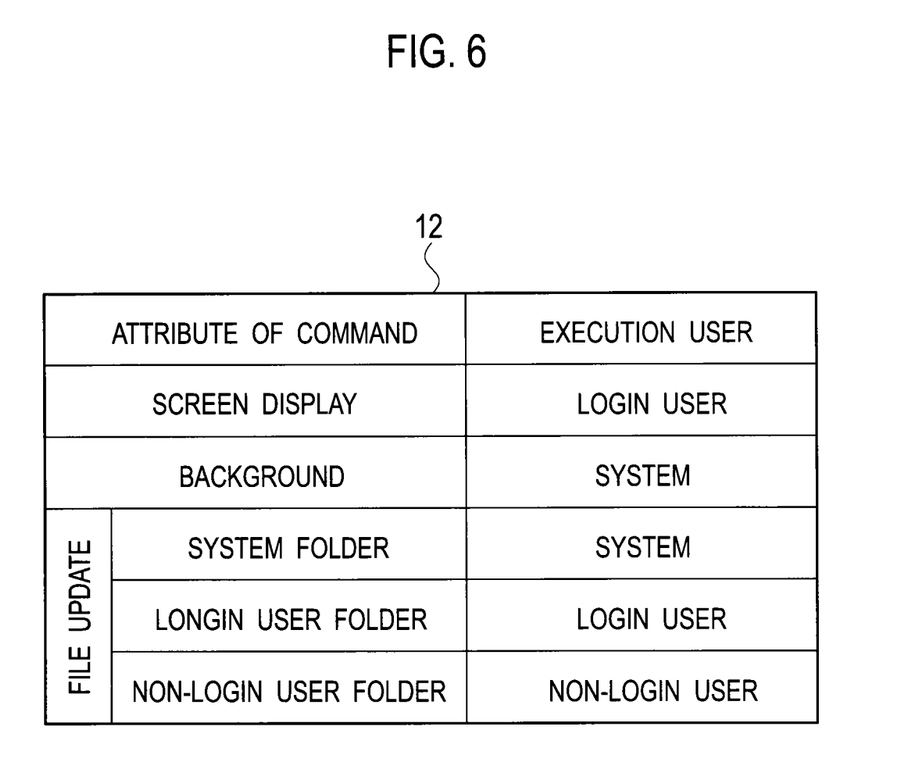
FIG. 6 is a diagram illustrating a data structure of command execution user data of the information processing device according to the embodiment of the present invention and an example of the data.

Here, as shown in FIG. 6, the command execution user data 12 is data associating the attribute of the command with a name of a user entitled to execute the command.

In the command execution user data 12 shown in FIG. 6, the command including a screen display can be executed by the user who is logging in, and the command executed in the background can be executed by the authority of the SYSTEM. Here, the command including the screen display cannot be executed by the user other than the login user. When the command executed in the background is executed without the authority of the SYSTEM, an error message, a confirmation message or the like is displayed, and thus it is impossible to smoothly execute the command.

Furthermore, in updating of a file, the execution user differs according to the type of target file to be updated. It is shown that the file of a system folder can be updated only by the authority of the SYSTEM. It is shown that the file of a folder of the login user can be updated only by the login user. It is shown that the file of a folder of a non-login user can be updated only by such a non-login user.

The command execution unit 41, when receiving a command to be executed, specifies the user entitled to execute the command from the command execution user data 12, and executes the command as the user. Here, the command execution unit 41 generates a new process and executes the command with the extracted user name in the process.

For example, when the command including the screen display is executed, the command execution unit 41 reads the command execution user data 12, and determines that the user entitled to execute this command is the login user. Thereafter, the command execution unit 41 newly generates, with the current login user, a process for the execution of the command on the screen display. In Windows (registered trademark), the command execution unit 41 acquires the user name that is logging in, thereafter calls the API of CreateProcessWithLogonW, and gives, over to a new process, as parameters, the user name that is logging in and the command pass of the execution command. In the newly generated process, the command on the screen display is executed.

In addition, when the command is executed in the background, the command execution unit 41 reads the command execution user data 12, and determines that the user entitled to execute this command is the SYSTEM. Thereafter, the command execution unit 41 switches to the SYSTEM authority and newly generates a process for executing the command in the background. In Windows (registered trademark), the command execution unit 41 calls the API of CreateProcess, and gives, over to a new process, as a parameter, the command pass of the command executed in the background. Thereafter, in the newly generated process, the command is executed in the background.

Moreover, when the command for updating the file of the folder of the non-login user is executed, the command execution unit 41 reads the command execution user data 12, and determines that the user entitled to execute this command is the user of the target folder to be updated. Thereafter, the command execution unit 41 switches to the non-login user, and newly generates a process for executing the command in the background. In Windows (registered trademark), the command execution unit 41 calls the API of CreateProcessAsUser, and gives over as parameters, the user name of the non-login user, the password and the command pass of the executed command. Thereafter, in the newly generated process, the command for updating the file of the folder of the non-login user is executed by the authority of the non-login user.

Although, here, in the information processing device 1 according to the embodiment of the present invention, the command execution user data 12 is stored in the storage device 10, the present invention is not limited to this configuration. For example, in the program of the service providing unit 40 and the command execution unit 41, a table corresponding to the command execution user data 12 may be included. Processing for specifying the execution user for each command may be included in the program.

As described above, in the information processing method and the information processing program according to the embodiment of the present invention, the application program causes the service program to execute a predetermined command. Here, the service program generates, according to the attribute of the command, as the user entitled to execute the command, the process that can execute the command, and executes the command in the process.

Thus, even when the execution of the command is limited by the access limitation of the operation system in the information processing device, the user is appropriately switched, and thus it is possible to appropriately execute an arbitrary command. Since the attribute of the command and the user entitled to execute the command are stored in the command execution user data 12, it is possible to meet security enhancement that is expected to be required in the future. Even if security is changed in the future and rigorous access limitation is further provided, in the information processing method according to the embodiment of the present invention, the application itself is not required to be improved, with the result that the command execution user data 12 is updated to meet the requirement.

In the embodiment of the present invention, the service receives a request for the execution of the command to execute the command, and thus it is possible to execute the command regardless of whether or not the user logs in. It is expected that, as security is enhanced in the future, constrains on applications and limitations on access authority and the like will be rigorously required; on the other hand, it is difficult to think that such limitations on the service will be rigorously required. Hence, the service executes the command, and thus it is possible to easily cope with future changes on the operation system.

Furthermore, since the service is operated by the SYSTEM authority, it is possible to expect the stable operation as compared with an application. The service executes the command, and thus it is possible to stably operate the information processing device 1. Furthermore, for example, since the state of a device such as the UPS and information such as a warning can be appropriately output to the information processing device 1, it is possible to expect the stable operation of these devices.

Conventionally, in an operation system having a specification in which session 0 is separated and is made to execute only service in session 0, even if a command for displaying a screen or the like is input into session 0, it is disadvantageously impossible to display the screen. However, in the embodiment of the present invention, since the service switches the user to implement the command, even if such an operation system is used, it is possible to avoid a problem caused by the separation of session 0 and thereby execute the command for displaying the screen.

Moreover, in the command execution user data 12, the execution user is individually specified, and thus it is possible to acquire the security of the information processing device 1. For example, all commands can also be executed by setting the execution user at the "SYSTEM." However, when all commands are executed in the "SYSTEM", the intention of enhancing the security is lost. Hence, in the command execution user data 12 according to the embodiment of the present invention, for each command, a user entitled to execute the command is set. A name of a user entitled to execute each command and having a lower level of authority is set in the command execution user data 12, and thus it is possible not only to ensure security but also to correct the problem caused by the enhancement of security.

Furthermore, in the information processing method according to the embodiment of the present invention, since an application is operated in an old operation system, it is possible to cope with every environment without the utilization of a compatible mode provided by the operation system.

(Other Embodiments)

Although the embodiment of the present invention has been described above, it should not be understood that part of this disclosure and the drawings do not limit this invention. Various other embodiments, examples and useful technologies are made clear from this disclosure.

It is needless to say that the present invention includes various embodiments and the like which are not described here. Therefore, the technical scope of the present invention is determined only by a subject matter according to the scope of claims appropriate to the above description.

What is claimed is:

1. An information processing method of executing a command in a computer that communicate with an information terminal in which a user entitled to execute the command is limited by an attribute of the command, the method comprising:
    storing, in a storage device, command execution user data associating the attribute of the command with a name of a user entitled to execute the command in response to an event of the information terminal;
    providing a service being resident in a memory of the computer;
    receiving a request of execution of a command executable only by a predetermined user with the service upon receiving the event of the information terminal; and
    extracting, when the execution of the command is requested, the name of the user entitled to execute the requested command from the command execution user data;
    when the execution user is a login user, executing the command at the timing of execution of the command with the execution user name; and
    when the execution user is not the login user, executing the command at the timing of the execution of the command with a specified user name.

2. The information processing method according to claim 1, wherein the receiving receives the request of execution of the command from the computer or a communication network.

* * * * *